Patented Apr. 24, 1934

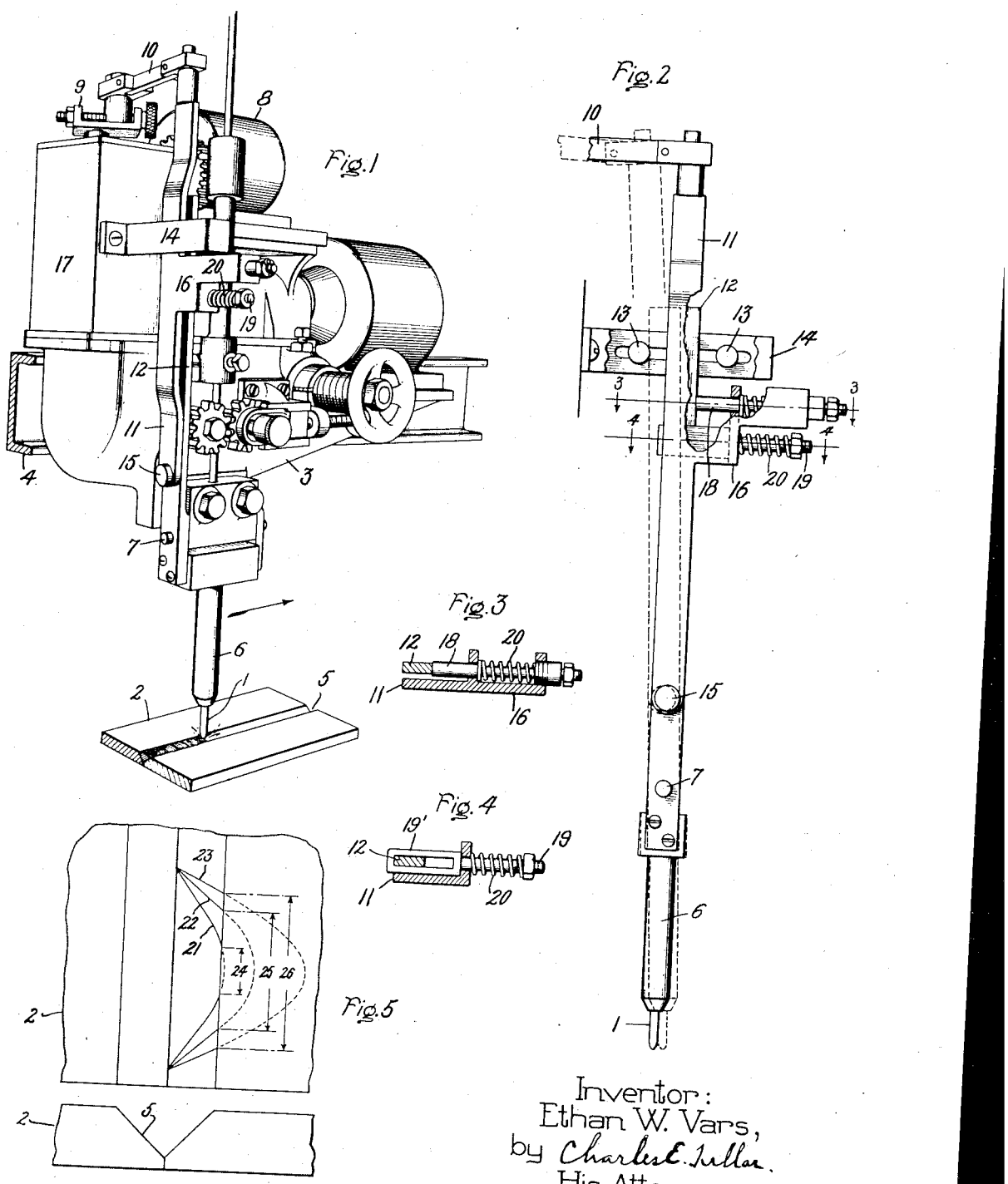

1,956,406

UNITED STATES PATENT OFFICE 1,956,406

WELDING

Ethan W. Vars, Erie, Pa., assignor to General Electric Company, a corporation of New York Application August 23, 1932, Serial No. 630,047

10 Claims. (Cl. 219—8)

My invention relates to fusion welding, and more particularly to automatic welding machines wherein means are provided for oscillating the source of heat across the work.

An object of my invention is to provide an improved method of and means for controlling the welding operation by oscillating the welding agency across the seam and temporarily arresting it on opposite sides of the seam during its oscillating movement to impart a greater heating effect to the edge portions of the seam than is imparted to the center thereof.

My invention is of particular utility in welding parts of substantial thickness which are grooved at the seam prior to welding in order to facilitate the welding operation. In accordance with my invention the oscillatory movement of the welding agency is controlled so as to impart the greatest amount of heat to the edges of the groove where the metal to be welded is thickest.

My invention will be better understood from the following description taken in connection with the accompanying drawing, in which I have shown my invention as applied to an automatic arc welding machine.

In the drawing Fig. 1 is a perspective view of one form of my invention illustrating its relation to an automatic arc welding head with which it is associated; Fig. 2 is a detail view showing the construction of the oscillating mechanism; Fig. 3 is a view partly in section taken along the lines 3—3 of Fig. 2; Fig. 4 is a view partly in section along the lines 4—4 of Fig. 2, and Fig. 5 is a diagram illustrating the operation of my oscillating mechanism.

Referring to the drawing, the welding agency there illustrated is the arcing end of an electrode 1 which is fed toward and away from the work 2 by an automatic arc welding head 3 to strike and thereafter maintain an arc during the welding operation. The welding head and the work are traversed relative to one another during the welding operation by any suitable means. In the arrangement illustrated, the head is supported on a carriage which travels, during the welding operation, along a track 4 which parallels the seam 5 between the work parts which are to be united by welding.

The electrode is guided relatively to the work by a tube or nozzle 6 which is pivotally attached at 7 to the electrode feeding means 3. The nozzle and electrode are oscillated across the seam during the welding operation by a motor 8 which is connected thereto through a crank 9, a connecting rod 10 and arms 11 and 12.

In the arrangement illustrated, arm 12 is connected directly to the nozzle 6 and its movement, as well as the movement of the nozzle, is limited by stops 13 which engage the upper end of the arm 12 and which are adjustably supported in a slot in the bracket 14 attached to the welding head. Arm 11 is pivotally attached at 15 to arm 12 and motion is transferred from one arm to the other by a yielding connection 16 which is shown in detail in Figs. 2, 3 and 4. This yielding connection transmits the movement of arm 11 to arm 12 and permits a relative movement between these arms when the movement of arm 12 is limited by stops 13.

The throw of crank 9 is adjustable and capable of transmitting to arm 11 an oscillating movement greater in amplitude than the maximum movement permitted arm 12 by stops 13. Motor 8 is connected to crank 9 through reduction gearing enclosed in the casing 17. The speed of motor 8 and/or the connection of the gearing in casing 16 may be adjusted to control the frequency of oscillation to suit the thickness of the material being welded. A frequency of about 8 per minute is often employed.

As shown in Figs. 2, 3 and 4, the movement of arm 11 is transmitted to arm 12 through a push rod 18 and a pull rod 19. These rods are supported on arm 11 and engage arm 12. Push rod 18 merely abuts against the arm 12 while pull rod 19 is provided with a slotted portion 19' which surrounds arm 12 and permits a predetermined limited movement thereof with regard thereto in a direction against the action of push rod 18. Rods 18 and 19 are biased by springs 20 to the positions illustrated in Figs. 2, 3 and 4.

When an oscillating movement is imparted to arm 11 this movement is transmitted to arm 12 until it engages the adjustable stops 13 when, due to the yielding connection including push rod 18 and pull rod 19 above described, a relative movement between arm 11 and arm 12 takes place. The arrangement of the parts as pointed out above is such that an oscillating movement may be imparted to arm 11 which is greater in extent than the maximum movement permitted arm 12 by stops 13. These stops can be adjusted to limit the travel of the electrode in relation to the edges of the seam. An adjustment for movement of the electrode to the edges of the seam is shown in the diagram illustrated in Fig. 5. Fig. 5 also shows the work parts and the seam between them which has been grooved in order to facilitate the welding operation. The groove thus provided leaves the work parts thicker at the edges of the seam than at its center and by means of the apparatus above described the welding arc may be caused to dwell for a longer period of time at any desired point near the edges of the seam than at its center. As shown in the diagram of Fig. 5, the normal travel of the nozzle 6 and the electrode fed through it would be along the sinusoidal curves 21, 22 or 23, depending upon the adjustment of the throw of crank 9. By reason of the stops 13 which engage arm 12 and limit its movement as well as the movement of the nozzle 6 and the electrode fed therebetween, this travel is modified by limiting the movement of the electrode so that the arc established between it and the work does not travel more than a predetermined distance beyond the center of the seam, thus producing an oscillatory movement in which the arc is arrested on opposite sides of the seam for predetermined periods of time 24, 25 and 26. Only three adjustments have been illustrated in a diagram of Fig. 5 to illustrate the manner in which different periods of dwell may be obtained, but it will be apparent that it is possible to adjust the period of dwell to any desired value limited only by the physical dimensions of the parts employed in the oscillatory mechanism.

By removing stops 13 or by the proper adjustment of these stops it is possible to employ my oscillator for imparting to the electrode the usual sinusoidal movement heretofore usually employed in welding operations. It is also possible by interrupting the operation of motor 8 or by placing the crank pin of crank 9 on the center of the crank to completely interrupt the oscillating operation. The speed of oscillation may be controlled by adjusting the speed of motor 8 or the connections of the gear transmission enclosed within casing 17.

When welding thick metal parts requiring more than one deposit of metal to complete the weld, I find it desirable to adjust the stops 13 for limiting the movement of the electrode to the edges of the seam only when depositing the top layer of metal. It is apparent, of course, that the stops 13 may be adjusted unequal distances from the center of oscillatory movement of arm 12, and such an adjustment is desirable when welding parts of unequal thickness. With such an adjustment the center of oscillation will be shifted to some position near the thick side of the seam to produce periods of longer dwell on the metal of greater thickness.

The arrangement above described illustrates one embodiment of my invention and it is to be understood that various other arrangements may be employed without departing from my invention.

What I claim as new and desire to secure by Letters Patent of the United States, is:—

1. Welding apparatus comprising a welding agency, means for oscillating said agency across the seam to be welded, and means for temporarily arresting said welding agency at predetermined distances from the center of said seam on opposite sides thereof during the oscillating movement of said agency.

2. Welding apparatus comprising a welding agency, means for alternately applying said agency to the opposite edges of the seam to be welded at predetermined distances from the center thereof, and means for adjusting the period of time during which said agency is applied to the edges of said seam.

3. Apparatus comprising a welding agency, means for alternately applying said agency to the opposite edges of the seam to be welded, means for adjusting the period of alternation of said agency, and means for adjusting the period of time during which said agency is applied to the edges of the seam.

4. An oscillating mechanism for welding machines comprising means for pivotally supporting the welding agency, means for limiting the movement of said agency, means capable of imparting to said agency an oscillating movement greater than the maximum movement permitted by said limiting means, and a yielding connection between said last mentioned means and said agency.

5. An oscillating mechanism for welding machines comprising means for pivotally supporting the welding agency, means for limiting the movement of said agency, means capable of imparting to said agency an oscillating movement greater than the maximum movement permitted by said limiting means, a yielding connection between said last mentioned means and said agency, means for adjusting said limiting means, and means for adjusting the throw of said means for imparting oscillating movement to said agency.

6. An oscillating mechanism for welding machines comprising means for pivotally supporting the welding agency, an arm attached to said agency, a plurality of stops for limiting the throw of said arm, a second arm pivotally attached to said first mentioned arm, means for oscillating said last mentioned arm, and a yieldable connection between said arms.

7. An oscillating mechanism for welding machines comprising a pivotally supported welding agency, an arm attached to said agency, a second arm pivotally attached to said first mentioned arm, means for oscillating said last mentioned arm, means for limiting the amplitude of oscillation of said first mentioned arm to a value less than the amplitude of oscillation of said second mentioned arm, and a yieldable connection between said arms.

8. An oscillating mechanism for welding machines comprising a pivotally supported welding agency, an arm attached to said agency, a second arm pivotally attached to said first mentioned arm, means for oscillating said last mentioned arm, means for adjusting the amplitude of oscillation of said last mentioned arm, means for limiting the amplitude of oscillation of said first mentioned arm to a value less than the amplitude of oscillation of said second mentioned arm and a yieldable connection between said arms for transmitting the oscillating movement of said last mentioned arm to said first mentioned arm and to the welding agency.

9. Welding apparatus comprising electrode feeding means, means for traversing said feeding means and the work to be welded relatively to one another, an electrode guide tube, means for supporting said guide tube for oscillatory movement across the seam to be welded, an arm attached to said guide tube, a second arm pivotally attached to said first mentioned arm, means for oscillating said last mentioned arm, a yieldable connection between said arms, and means for adjusting the amplitude of oscillation of said first mentioned arm relatively to the amplitude of oscillation of said second mentioned arm.

10. Welding apparatus comprising electrode feeding means, means for traversing said feeding means and the work to be welded relative to one another, an electrode guide tube pivotally supported relatively to said feeding means, an arm attached to said guide tube, a second arm pivotally attached to said first mentioned arm, means for oscillating said last mentioned arm, means for limiting the amplitude of oscillation of said first mentioned arm to a value less than the amplitude of oscillation of said second mentioned arm, and a yieldable connection between said arms.

ETHAN W. VARS.